United States Patent
Hall et al.

(10) Patent No.: US 8,052,028 B2
(45) Date of Patent: Nov. 8, 2011

(54) DEVICE FOR USE WITH A FRICTION STIR SPOT WELDING (FSSW) APPARATUS

(75) Inventors: Mark T. Hall, Troy, MI (US); Robert T. Szymanski, St. Clair Township, MI (US); Yen-Lung Chen, Troy, MI (US); Corey C. Holupko, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 428 days.

(21) Appl. No.: 12/139,580

(22) Filed: Jun. 16, 2008

(65) Prior Publication Data

US 2009/0308913 A1 Dec. 17, 2009

(51) Int. Cl.
*B23K 20/12* (2006.01)
(52) U.S. Cl. ........... 228/2.1; 228/112.1
(58) Field of Classification Search .......... 228/112.1, 228/2.1
See application file for complete search history.

(56) References Cited

U.S. PATENT DOCUMENTS

| | | | |
|---|---|---|---|
| 2006/0102689 A1* | 5/2006 | Trapp et al. | 228/2.1 |
| 2006/0124691 A1* | 6/2006 | Wood et al. | 228/2.1 |
| 2007/0152015 A1* | 7/2007 | Burton et al. | 228/2.1 |
| 2008/0006677 A1* | 1/2008 | Kumagai et al. | 228/101 |
| 2008/0112768 A1* | 5/2008 | Matlack et al. | 408/1 BD |

* cited by examiner

*Primary Examiner* — Jessica L Ward
*Assistant Examiner* — Erin Saad
(74) *Attorney, Agent, or Firm* — Lionel D. Anderson; Reising Ethington P.C.

(57) ABSTRACT

A device for use with a welding apparatus, such as a friction stir spot welding (FSSW) apparatus, that maintains work pieces in a generally flat or flush orientation during a welding operation. The device can be mounted to the operable end of an FSSW apparatus so that it exerts a stabilizing force against an upper work piece. The stabilizing force exerted by the device prevents the upper work piece from deflecting when the rotating tool of the FSSW apparatus passes through the upper work piece and penetrates into the lower work piece. In an exemplary embodiment, the device includes a housing component that slidably receives a movable component under the force of a biasing component.

10 Claims, 2 Drawing Sheets

DEVICE FOR USE WITH A FRICTION STIR SPOT WELDING (FSSW) APPARATUS

TECHNICAL FIELD

The present invention generally relates to a device that can be used with a welding apparatus and, more particularly, a friction stir spot welding (FSSW) apparatus.

BACKGROUND

Friction stir spot welding (FSSW) is a solid-state welding technique that creates a spot weld without melting the work pieces. In an FSSW process, a rotating tool with a contoured tip is plunged against two or more work pieces, such as flat sheet metal pieces, such that the resulting friction joins the work pieces together. During this process, the tip of the rotating tool penetrates through the top work piece and enters into the lower work piece. As the tip of the rotating tool exits the faying surface of the top work piece and enters the faying surface of the lower work piece, the rotating tool can cause the upper work piece to lift off of and deflect away from the lower work piece. This, in turn, can create an undesirable space or gap between the two work pieces where material can flow into.

With reference to FIG. 1, there is shown a weld assembly 10 having upper and lower work pieces 12, 14 that exhibit the above-explained phenomenon; notice how the faying surface of upper work piece 12 near weld 16 is not flush with the faying surface of lower work piece 14. It can be undesirable to have a deflected arrangement like this, as the deflected work piece can interfere with other components, etc. Contrast this deflected condition with weld assembly 20, which includes flat upper and lower work pieces 22, 24 joined by weld 26. In this example, the faying surfaces of upper and lower work pieces 22, 24 are flat and are in flush contact with one another.

SUMMARY OF THE INVENTION

According to one embodiment, there is provided a device for use with a welding apparatus that comprises a housing component, a movable component, and a biasing component. During operation, the welding apparatus is advanced towards a work piece so that a contact surface of the movable component contacts the work piece and urges the movable component into the housing component against the force of the biasing component.

According to another embodiment, there is provided a device for use with a welding apparatus that comprises a housing component, a movable component, and a biasing component. During operation, a contact surface of the movable component contacts the work piece so that: i) the movable component is pushed into the housing component, ii) the biasing component is compressed within the housing component, and iii) a rotating tool of the welding apparatus is allowed to extend out of the movable component and penetrate the work piece.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The device disclosed herein can be used with a friction stir spot welding (FSSW) apparatus to maintain one or more work pieces in a generally flat or flush orientation during a welding operation. More specifically, the disclosed device can be mounted or otherwise attached to the operable end of an FSSW apparatus—that is, the portion of the FSSW apparatus located near the rotating tool—so that it exerts a stabilizing force against an upper work piece. The stabilizing force exerted by the device prevents the upper work piece from deflecting when the rotating tool of the FSSW apparatus passes through the upper work piece and penetrates into the lower work piece. Although the following description is provided in the context of an FSSW apparatus, it should be appreciated that the device disclosed herein could be used with other types of welding apparatuses known in the art and is not limited to FSSW machines only.

Figure 2:
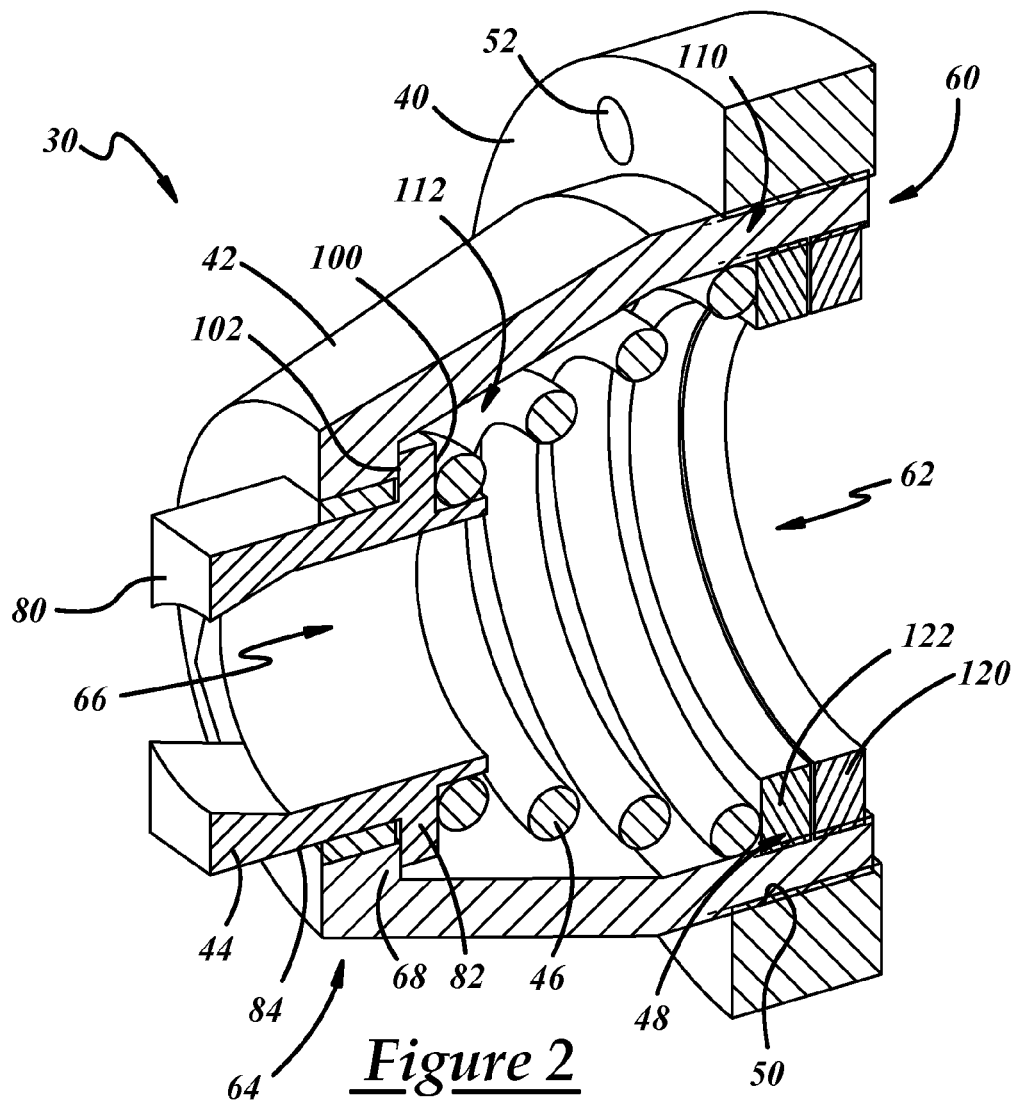
FIG. 2 is a perspective cut-away view of an exemplary embodiment of a device that can be used with a friction stir spot welding (FSSW) apparatus.

Turning now to FIG. 2, there is shown an exemplary embodiment of a device 30 that can be used with a welding apparatus, such as an FSSW apparatus. According to this particular embodiment, device 30 is attached to the operable end of FSSW apparatus (not shown) and includes an annular collar 40, a housing component 42, a movable component 44, a biasing component 46, and a backstop 48. It should be recognized that exemplary embodiment 30 is only one possibility, as other embodiments, including those having more, less, or different components than that shown here, could also be used.

Annular collar 40 is connected to one or more components of device 30, and facilitates attachment of that device to the FSSW apparatus. In this particular embodiment, annular collar 40 is a ring-shaped component that surrounds housing component 42 at a first end and includes interior threads 50 and mounting features 52. Interior threads 50 circumferentially extend around an inside surface of annular collar 40 and interact with complementary threads located on an outside surface of housing component 42. Of course, features other than threads could be used to connect or attach annular collar 40 to the rest of device 30 including bolts, screws, shoulders, flanges, or any other attachment features known in the art. Mounting features 52 provide annular collar 40 with means for attaching to the FSSW apparatus. In the particular embodiment shown here, mounting features 52 include a number of bolt holes spaced around the circumference of annular collar 40. Bolts can be inserted into the bolt holes so that they engage complementary bolt holes in a mounting plate of the FSSW apparatus. It should be appreciated that numerous designs and embodiments could be used to attach device 30 to a welding apparatus, such as a FSSW apparatus; the exemplary embodiment shown here just being one of them.

Figure 3:
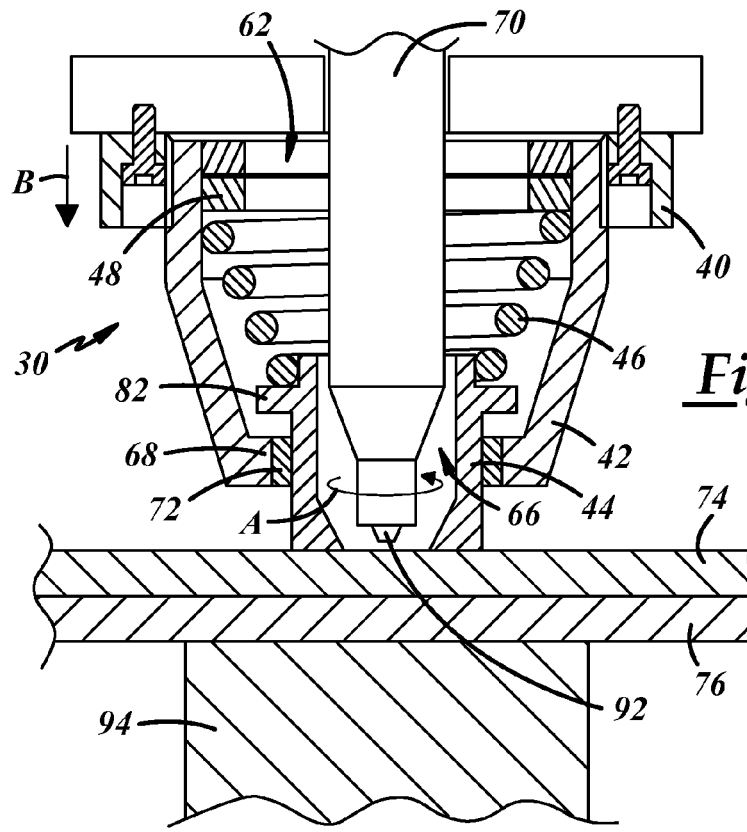
FIG. 3 is a side cut-away view of the exemplary device from FIG. 2, where the device is shown in operation.

Housing component 42 encompasses various parts and components of device 30 and, according to this exemplary embodiment, includes a first end 60 with a first opening 62, a second end 64 with a second opening 66, and an interior shoulder 68. According to this particular embodiment, first end 60 is diametrically larger than the second end 64 and includes an end surface that mates with a mounting plate or other abutment features of the FSSW apparatus. Second end 62 is the outward end of housing component 42 and can be generally concentric with second opening 66. The actual shape of housing component 42 can vary, but several exemplary shapes include: a non-tapered shape where the housing component is comprised of one or more cylindrical sections extending between the first and second ends 60, 64, a tapered shape (such as that shown in the drawings) where the housing component tapers in a generally conical form from the first end 60 to the second end 64, and a curved shape where the housing component tapers in a concave or convex fashion between the first and second ends 60, 64, to name but a few. As is best seen in FIG. 3, the first and second openings 62, 66 are designed to accommodate a rotating welding tool 70 so that the tool can extend through the openings and contact one or more work pieces 74, 76, as will be explained in more detail. Second end 64 can receive an optional bushing 72 mounted in second opening 66. The bushing promotes a smooth sliding movement with movable component 44 and could be replaced with bearings or any suitable feature that accommodates movement between two parts. In a different embodiment, bushing 72 is omitted.

Turning back to FIG. 2, interior shoulder 68 is located on the inside or interior of housing component 42 and acts as a stop for movable component 44. Put differently, interior shoulder 68 prevents movable component 44 from being pushed or expelled out of housing component 42 by biasing component 46. Although the interior shoulder is shown here as a generally uniform annular shoulder located near the second end 64 of the housing component, it should be appreciated that any feature capable of properly maintaining movable component 44 within the housing component could be used. For example, the annular interior shoulder 68 could be replaced with one or more tabs, stops, tapers, etc., and it could be moved further away from second end 64, to cite but a couple of exemplary alternatives.

Movable component 44 slides back-and-forth within housing component 42, and is designed to contact and exert a stabilizing force against a work piece so that it can be maintained in a proper position during a welding operation. The exemplary embodiment shown in FIG. 2 includes a contact surface 80 located outside of housing component 42, an exterior shoulder 82 located inside of the housing component, and a sliding surface 84 located therebetween. Contact surface 80 is designed to contact and press against an upper work piece 74 so that during a welding process the upper work piece is flushly maintained against a lower work piece. Movable component 44 slides within second opening 66 but does not generally rotate. Thus, movable component 44 generally stays rotationally stationary as welding tool 70 spins inside of it (of course, there could be some inadvertent rotation of movable component 44, but usually this type of rotation is not comparable to that of the rotating tool 70).

Figure 4:
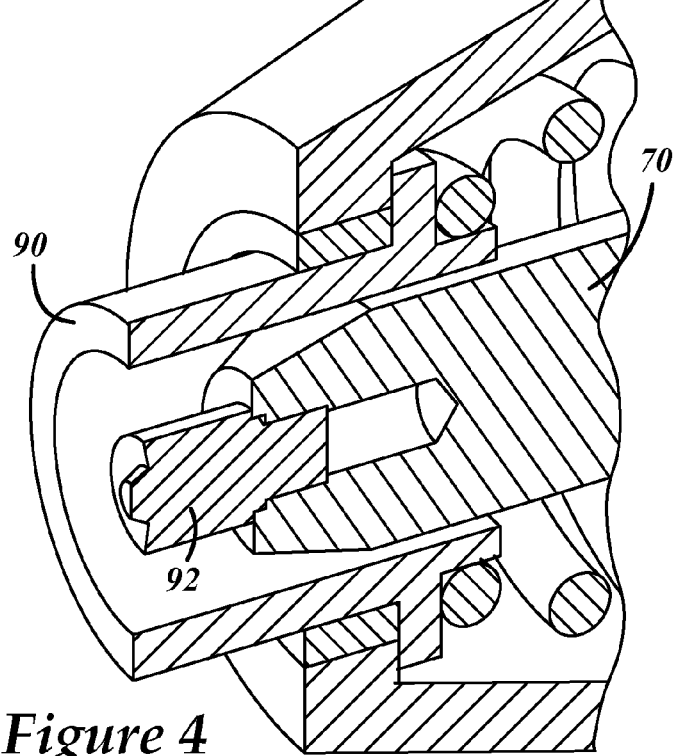
FIG. 4 is a perspective cut-away view of another embodiment of a device that can be used with a friction stir spot welding (FSSW) apparatus, where the embodiment shown here has a different contact surface than that shown in FIG. 2.

In the example of FIG. 2, contact surface 80 is a discontinuous surface that includes two separate surfaces that surround welding tool 70 and contact a work piece. It should be appreciated that other contact surface configurations, including those having fewer or greater numbers of separate contact surfaces (e.g., one, three, four, five contact surfaces, etc.), and those with different shapes and/or sizes could also be used. For example, FIG. 4 shows another embodiment where a contact surface 90 is a continuous surface and includes a single annular surface for contacting the work piece; this is only one possible embodiment, as many others could also be used. In this embodiment, the contact surface 90 of the movable component surrounds a rotating welding tool 70 equipped with a contoured tip 92. It should be appreciated that the device shown here could be used with any number of contoured tips, rotating tools, FSSW apparatuses, other welding apparatuses, etc. and is not limited to use with the exemplary embodiments shown and described herein.

With reference back to FIG. 2, exterior shoulder 82 extends outwardly from movable component 44 and is designed to engage the interior shoulder 68 of the housing component. In this particular embodiment, exterior shoulder 82 is an annular shoulder or flange that circumferentially extends around movable component 44 and is sized and shaped to nest within the spaced created by the interior shoulder 68. As with interior shoulder 68, the exterior shoulder does not have to be the annular shoulder or ring shown here, but instead could be replaced with one or more tabs, stops, tapers, protrusions, or any other feature capable of interacting with an interior component of housing component 42 such that movable component 44 is maintained in position. Moreover, exterior shoulder 82 does not need to be located in the precise position shown in the drawings; instead, the exterior shoulder could be moved along movable component 44 so that it is closer to or further from contact surface 80. In an exemplary arrangement, exterior shoulder 82 includes a first annular surface 100 that engages a second end of biasing component 46 and a second annular surface 102, which is located on the other side of the exterior shoulder so that it engages interior shoulder 68.

Biasing component 46 exerts a force on movable component 44 and outwardly urges it towards a work piece. In the specific embodiment shown here, biasing component is a spring with a first end 110 that contacts backstop 48 and a second end 112 that contacts first annular surface 100, as already explained. The spring can be tapered so that it conforms to the interior shape of housing component 42; in this example, the first end 110 of the spring is diametrically larger than the second end 112, however, other spring arrangements could be used. Skilled artisans will appreciate that biasing component 46 could include one of a large number of different types of springs, as well as other non-spring components so long as they are able to exert an appropriate bias force against movable component 44.

Backstop 48 provides biasing component 46 with a surface from which it can push off and, according to exemplary embodiment shown here, is a two-piece component that includes a first and second annular rings 120, 122. The first annular ring 120 can include circumferential threads on its exterior that are designed to interact with complementary threads on the interior of housing component 42. In some instances, it may be desirable to permanently attach the first annular ring 120 within the housing component. Second annular ring 122 also includes circumferential threads on its exterior and, according to one arrangement, is adjustable. Put differently, the position of second annular ring 122 can be adjusted by threadingly moving the ring back-and-forth within housing component 42. The more second annular ring 122 is advanced towards movable component 44 and the first end of the device, the more biasing component 46 is compressed. One can therefore adjust the force exerted by biasing component 46, and hence the stabilizing force exerted by movable component 44 against a work piece, by adjusting the position of second annular ring 122.

Figure 1:
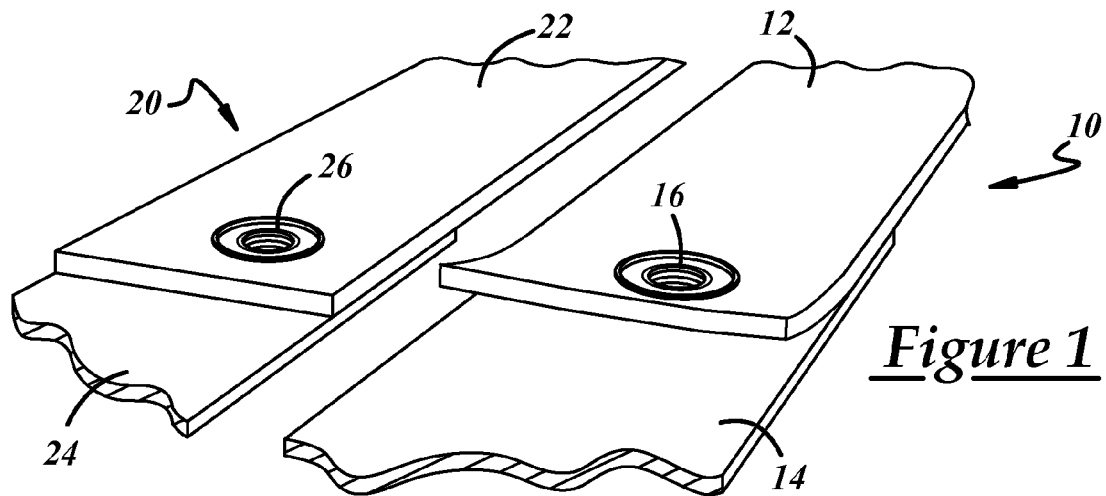
FIG. 1 is a perspective view of two weld assemblies, where the weld assembly on the right has faying surfaces that are not flush with one another and the weld assembly on the left has faying surfaces that are flush with each other.

With reference to FIG. 3, there is shown an exemplary device 30 in operation. In this example, an FSSW apparatus uses a motor to spin rotating tool 70 in a direction A and a drive mechanism to advance the rotating tool in a direction B. The FSSW apparatus is advanced until contact surface 80 contacts a top surface of upper work piece 74, at which point further advancement of the apparatus causes movable component 44 to be urged into housing component 42 against the force of bias component 46. This is illustrated in FIG. 3, where the exterior shoulder 82 of the movable component is shown lifted off of interior shoulder 68 of the housing component. The stabilizing force exerted by movable component 44 cooperates with a support feature 94 located on the opposing side of work pieces 74, 76 to maintain the work pieces, particularly the area surrounding the weld, in a flat and flush orientation. This can help prevent the faying surfaces of work pieces 74, 76 from deflecting when the contoured tip 92 of rotating tool 70 penetrates therein, as shown and described in FIG. 1.

In one embodiment, device 30 is designed so that when movable component 44 is in a fully depressed or retracted position, contact surface 80 still extends slightly out of housing component 42. This prevents the tip end of housing component 42 from contacting the surface of upper work piece 74. It should be appreciated that this exemplary arrangement, namely an FSSW apparatus operating in conjunction with support feature 94, is only one possible application for device 30. Device 30 could also be used with any number of welding apparatuses, not just an FSSW apparatus, and could interact with other support features, like a C-clamp or C-frame, to cite a few possibilities.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A device for use with a welding apparatus, comprising:
    a housing component;
    a movable component being at least partially located in the housing component and having a discontinuous contact surface for contacting a work piece and a central opening for accommodating the welding apparatus, the discontinuous contact surface includes a plurality of separate surfaces that surround the central opening and are interrupted by intervening spaces such that the discontinuous contact surface does not circumferentially enclose the central opening;
    a biasing component being at least partially located in the housing component; and
    a two-piece back stop that includes a stationary annular component that is attached to the housing component, and an adjustable annular component that is connected to the housing component and can be adjusted to affect the force exerted by the biasing component, wherein during operation the welding apparatus is advanced towards the work piece so that the discontinuous contact surface contacts the work piece and urges the movable component into the housing component against the force of the biasing component.

2. The device of claim 1, wherein the housing component is a single unitary piece that tapers from a larger first end located near the welding apparatus to a smaller second end located near the work piece.

3. The device of claim 2, wherein the larger first end is connected to an annular collar for mounting the device to the welding apparatus.

4. The device of claim 2, wherein the smaller second end is connected to a bushing for slidably receiving the movable component.

5. The device of claim 1, wherein the movable component further includes an exterior shoulder and a sliding surface, and the exterior shoulder is located within the housing component, the discontinuous contact surface is located outside of the housing component, and the sliding surface is located between the exterior shoulder and the discontinuous contact surface and promotes sliding within an opening of the housing component.

6. A device for use with a welding apparatus, comprising:
    a housing component;
    a movable component being at least partially located in the housing component and having a discontinuous contact surface for contacting a work piece and a central opening for accommodating the welding apparatus, the discontinuous contact surface includes a plurality of separate surfaces that surround the central opening and are interrupted by intervening spaces such that the discontinuous contact surface does not circumferentially enclose the central opening; and
    a biasing component being at least partially located in the housing component, wherein during operation the welding apparatus is advanced towards the work piece so that the discontinuous contact surface contacts the work piece and urges the movable component into the housing component against the force of the biasing component;
    the movable component further includes an exterior shoulder and a sliding surface, and the exterior shoulder is located within the housing component, the discontinuous contact surface is located outside of the housing component, and the sliding surface is located between the exterior shoulder and the discontinuous contact surface and promotes sliding within an opening of the housing component;
    wherein the exterior shoulder includes a first annular surface for engaging an end of the biasing component and a second annular surface for engaging an interior shoulder of the housing component.

7. A device for use with a welding apparatus, comprising:
    a housing component;
    a movable component being at least partially located in the housing component and having a discontinuous contact surface for contacting a work piece and a central opening for accommodating the welding apparatus, the discontinuous contact surface includes a plurality of separate surfaces that surround the central opening and are interrupted by intervening spaces such that the discontinuous contact surface does not circumferentially enclose the central opening; and a biasing component being at least partially located in the housing component, wherein during operation the welding apparatus is advanced towards the work piece so that the discontinuous contact surface contacts the work piece and urges the movable component into the housing component against the force of the biasing component;

wherein the biasing component is a conical spring that conforms to the interior shape of the housing component and extends from a first end that is in contact with a back stop to a second end that is in contact with an exterior shoulder of the movable component.

8. A device for use with a welding apparatus, comprising:

a single unitary housing component having a first opening, a second opening, an interior shoulder, and a conical interior shape;

a movable component having a discontinuous contact surface with a plurality of separate surfaces for contacting a work piece, a central opening for accommodating the welding apparatus, a sliding surface for sliding within the second opening of the housing component, and an exterior shoulder for engaging the interior shoulder of the housing component, the plurality of separate surfaces surround the central opening and are interrupted by intervening spaces such that the discontinuous contact surface does not circumferentially enclose the central opening;

a back stop being at least partially located in the second opening of the housing component and having an adjustable component; and a conical biasing component conforming to the conical interior shape of the housing component and having a first end in contact with the adjustable component of the back stop and a second end in contact with the movable component so that the position of the adjustable component influences the force exerted by the conical biasing component on the movable component, wherein during operation the discontinuous contact surface of the movable component contacts the work piece so that: i) the movable component is pushed into the housing component, ii) the conical biasing component is compressed within the housing component, and iii) a rotating tool of the welding apparatus is allowed to extend out of the movable component and penetrate the work piece.

9. The device of claim 8, wherein the housing component includes a first end located near the welding apparatus and a second end located near the work piece.

10. The device of claim 9, wherein the first end of the housing component is connected to an annular collar for mounting the device to the welding apparatus.

* * * * *